United States Patent [19]

Smith

[11] Patent Number: 4,860,616

[45] Date of Patent: Aug. 29, 1989

[54] METHOD AND APPARATUS FOR THE MANUFACTURE OF ROTARY SHEET DIES

[76] Inventor: Winford L. Smith, 109 Grassland Dr., Gallatin, Tenn. 37066

[21] Appl. No.: 208,228

[22] Filed: Jun. 17, 1988

[51] Int. Cl.⁴ .............................................. B23H 9/04
[52] U.S. Cl. ..................... 76/4; 76/107 C; 219/69.17; 219/69.2
[58] Field of Search .............. 76/4, 107 R, 107 C, 76/101 R, 101 A; 219/69 M, 69 V

[56] References Cited

U.S. PATENT DOCUMENTS

| | | | |
|---|---|---|---|
| 3,542,993 | 11/1970 | Buck | 219/69 G |
| 3,796,851 | 3/1974 | Pfuff | 219/69 M |
| 3,890,481 | 6/1975 | Buck | 219/69 M |
| 3,952,179 | 4/1976 | Baker | 219/69 M |
| 4,537,588 | 8/1985 | Ehlscheid | 76/107 C |
| 4,608,895 | 9/1986 | Bell et al. | 76/107 R |

*Primary Examiner*—Roscoe V. Parker
*Attorney, Agent, or Firm*—Mark J. Patterson

[57] ABSTRACT

A rotary sheet die suitable for use in the cutting of paper webs and the like is manufactured by securing the sheet to a hollow mandrel using mechanical clamps and internal vaccum. The mandrel and sheet assembly is then placed in an EDM apparatus in which vertical movement of the electrode is gear synchronized with the rotary movement of the mandrel and sheet combination. Chilled dielectric fluid is used to flush and cool the electrode and sheet die interface.

7 Claims, 4 Drawing Sheets

METHOD AND APPARATUS FOR THE MANUFACTURE OF ROTARY SHEET DIES

BACKGROUND OF THE INVENTION

The present invention relates to the manufacture of rotary sheet dies used for precise cutting of patterns in gasket material, paper, et cetera. More specifically, the present invention relates to the electrical discharge machining (EDM) of rotary sheet dies which are used for cutting patterns in such materials.

It has long been recognized that the use of rotary or cylindrical dies to cut blanks or patterns from sheets or webs of material such as paper, cardboard, plastic film, et cetera, is efficient and cost effective. A description of one method of using cylindrical dies in that fashion can be found in U.S. Pat. No. 4,608,895. Because of the accuracy and longevity required of such cylindrical dies, a number of machines and methods have been developed in the prior art to manufacture them. Some cylindrical cutting dies have been manufactured using a milling machine for cutting the die pattern. However, it has been found that the use of EDM technology to erode the die pattern on the die cylinder can provide a more efficient and accurate way of producing a die having a complex pattern. Examples of such methods and apparatus can be found in U.S. Pat. Nos. 3,542,993; 3,796,851; 3,890,481; and 3,952,179. However, these prior art devices and methods suffer from a number of significant problems. For example, those that use a cylindrical EDM electrode, as in U.S. Pat. No. 3,796,851, are more expensive because of the cost and difficulty in manufacturing the electrode. In addition, such an electrode is more difficult to machine, as compared to flat electrodes, and requires frequent adjustment of the position of the electrode and/or die cylinder to maintain proper arc spacing and alignment. Also, sophisticated timing devices must be used in order to properly synchronize the surface speeds of the cylindrical die work piece and the electrode.

The use of a flat electrode with a cylindrical die work piece, as in U.S. Pat. No. 3,890,481, solves some of these problems but creates more of its own. In a horizontal die cutting device such as that disclosed in the '481 patent, sediment and material eroded from the die cylinder is naturally trapped in the V-shaped grooves of the electrode, making flushing extremely difficult. Clean flushing is, of course, critical in order to provide a uniform spark gap which is very difficult to do if the dielectric fluid becomes contaminated with eroded sediment. In addition, it is very difficult to maintain proper orientation of the die cylinder as it moves horizontally across the fixed electrode matrix, as it has a tendency to skew as it moves. This results, of course, in inaccurate and imprecise cutting of the die pattern on the cylinder. Another problem with the prior art methods of manufacturing rotary cutting dies is the bulk and expense involved in using solid steel cylinders as the die work piece.

Although it is recognized in the prior art that the use of rotary dies made of thin steel sheets would solve some of these problems, no one has been able to successfully use EDM technology to manufacture rotary sheet dies that are usable without extensive hand finishing. Specifically, no prior art method of manufacturing rotary sheet dies has solved the problem of how to firmly and accurately hold the sheet in position while it is being electrically eroded, because of the effects of heat and mechanical stress.

What is needed, then, is a machine and method of manufacturing rotary sheet dies that employs fast and efficient EDM methods of cutting the dies and that results in a die that is cut with a precise and accurate pattern.

SUMMARY OF THE INVENTION

In the present invention, an electrode which is pre-engraved with the desired cutting pattern is mounted on a platen adapted for vertical movement on the frame of the EDM die manufacturing machine. Mounted horizontally on the bed of the machine is a hollow metal mandrel containing vacuum holes and special mechanical holding devices. A sheet of thin gauge steel is clamped to the mandrel such that the sheet is positioned and held in place but not restrained in such a fashion that it will move when subjected to the heat of the EDM process. The mandrel and sheet are now loaded onto the EDM machine. Vacuum is then applied from within the mandrel, drawing the center portions of the sheet in contact with the mandrel.

When the EDM machine is activated with the rotary sheet die in place, a rack gear on one side of the platen, which is spring loaded so as to allow movement in only one direction, engages a rotary spur gear on the mandrel. The vertically oriented electrode then moves downward simultaneously with rotation of the sheet die fixed to the mandrel, and the die pattern is eroded within the dielectric fluid. A special chiller system is used to circulate and cool the dielectric fluid in order to maintain its temperature and viscosity, thereby preventing distortion of the sheet die and excessive accumulation of eroded material in the grooves of the electrode pattern. A quick response servo motor, assisted by a counterbalance system, provides for rapid directional change of the platen and electrode.

DESCRIPTION OF THE PREFERRED EMBODIMENT

In the present apparatus and method, the operator starts with a steel sheet 10, typically 0.015 inches thick, which will be eroded to a thickness of approximately 0.005 inches, thereby forming a die cutting pattern. It has been found that spring steel such as 1075 carbon steel is acceptable. The crucial task that must be accomplished in using EDM technology to create a rotary sheet die is positioning and securing the sheet so that it will not bend or deform when subjected to the movement of the EDM machine and effects of the arc. The present invention overcomes this obstacle through a combination of mechanical clamping and vacuum holding.

Figure 1:
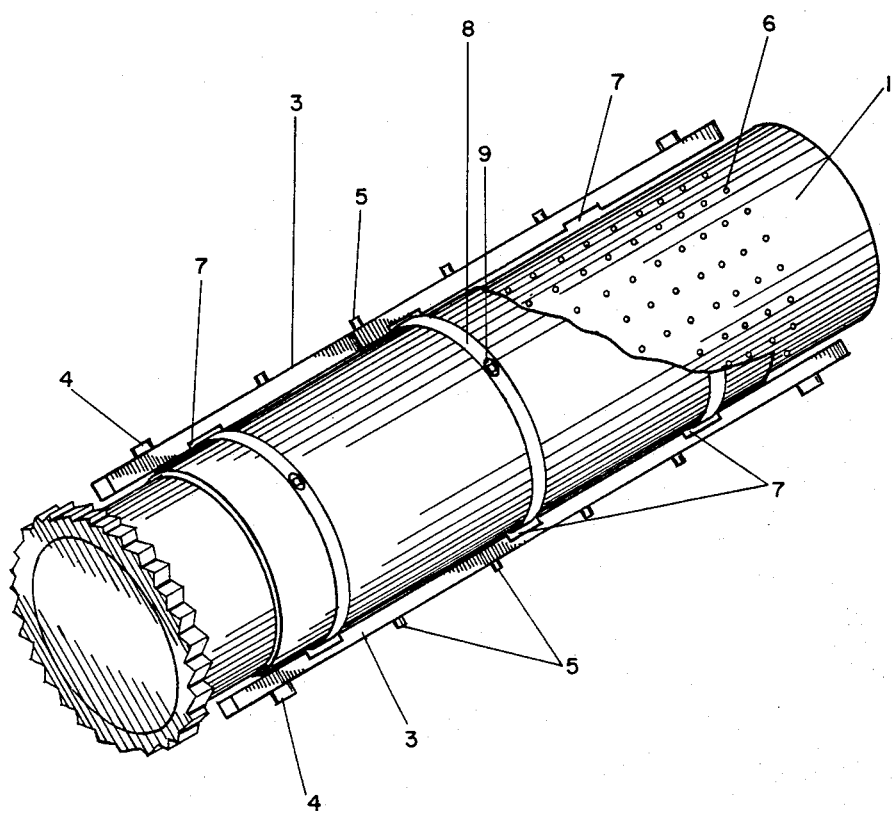
FIG. 1 is a perspective and partial phantom view of the sheet steel die, before erosion, clamped to the cylindrical mandrel before installation in the EDM machine.

To accomplish this, as best seen on FIG. 1, a steel cylindrical mandrel 1 is provided with bar clamps 3 which initially are loosely positioned with screws 4 to the end plates of mandrel 1. Sheet 10 is then slipped underneath one clamp 3 which is then tightened down using screws 4. Set screws 5 are used to firmly hold the end of sheet 10. Sheet 10 is then manually rolled around mandrel 1, and the other end is slipped under the second bar clamp 3. Again, screws 4 and set screws 5 are tightened to secure the other end of sheet 10. Multiple band clamps 8 are then placed around sheet 10, through slots 7 in bar clamps 3. Screw and gear assembly 9 is used to tighten band clamps 8 so that sheet 10 makes contact with mandrel 1 around its entire circumference. Bar clamps 3 are then removed.

Figure 3:
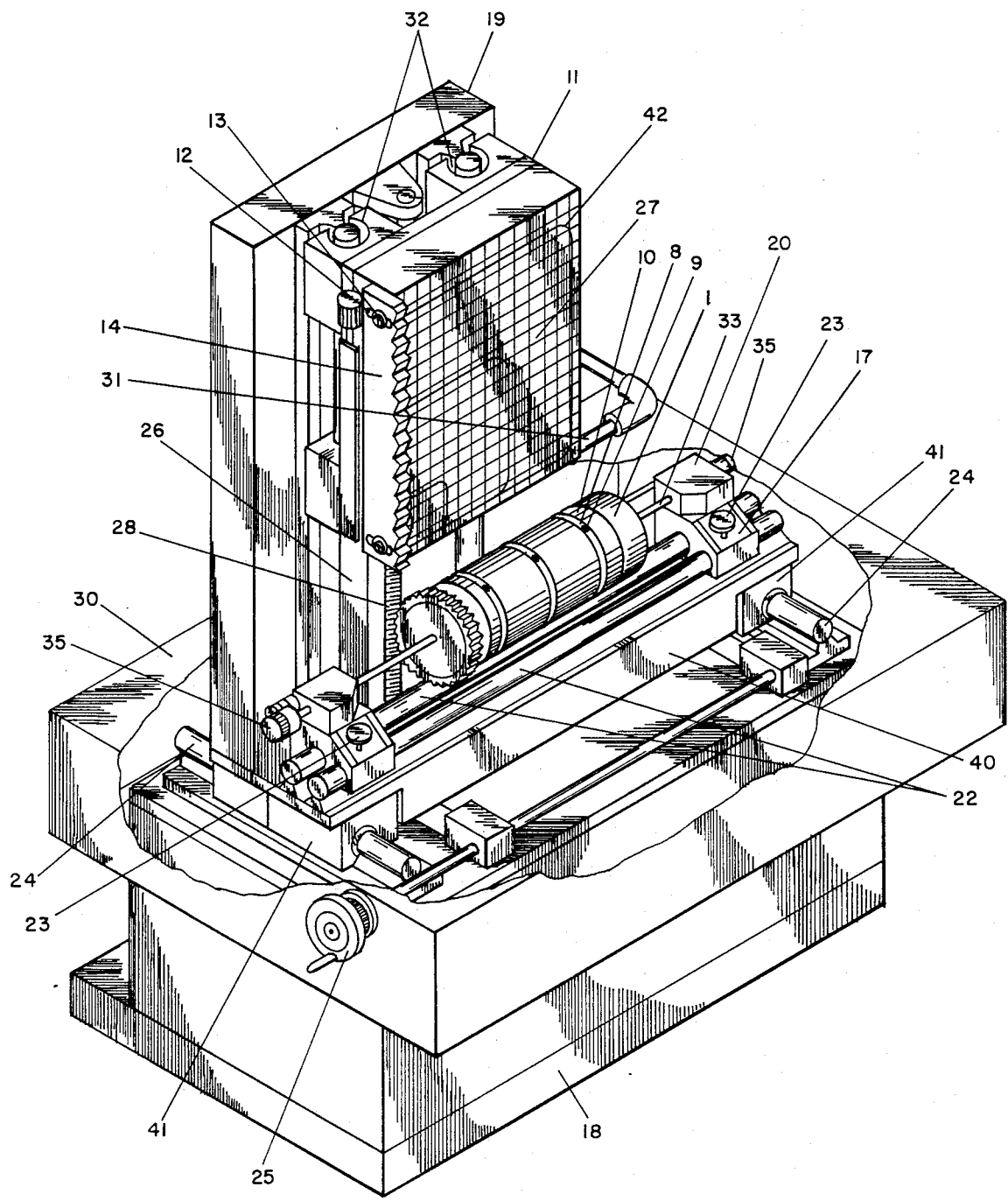
FIG. 3 is a front perspective view of the EDM machine with phantom view of the mandrel assembly and work tank.

As seen on FIG. 3, additional band clamps 8, approximately ½ the circumference of mandrel 1, are then attached to slots at the respective ends of sheet 10 and then tightened. This maintains the position of sheet 10 already established in the prior steps without placing sheet 10 under a strain which would be relieved by heating during the erosion process. Otherwise, when sheet 10 is heated, it can distort, thereby destroying the accuracy, consistency, and spacing between sheet 10 and the electrode during the erosion process.

The combination of sheet 10 and mandrel 1 is now ready for loading into the EDM machine. A vacuum pump is connected through the end of hollow mandrel 1 and, through vacuum holes 6 machined in the surface of mandrel 1, draws sheet 10 in contact with mandrel 1. In some instances, the operator may use a rubber mallet or roller to assist this process.

As best seen in FIG. 3, sheet 10 and mandrel 1 are mounted on a special EDM unit generally comprising base 18, mandrel support 17, vacuum platen 11, and vertical frame unit 19. Mandrel 1 is positioned and secured in conventional fashion to centers 33 on the upper blocks 20 of support 17 to allow rotation of mandrel 1 around its central axis. Tensioner knobs 35 adjust the position of centers 33. Upper blocks 20 of support 17 are slidably mounted around lateral guiderails 22 so that by loosening lateral support adjustment screws 23, the operator can properly position mandrel 1 and sheet 10 along guiderails 22.

Guiderails 22 are mounted to plate portion 40 of support 17 which, in turn, is mounted on horizontal guiderails 24, using bearing blocks 41. Horizontal adjustment knob and linear actuator assembly 25 is used by the operator to properly position mandrel 1 with respect to the electrode (not shown) so as to maintain a uniform arc gap of approximately 0.002 inches.

Attached to vertical frame 19 using flanged block ball bushings 32 around vertical guiderails 26, is platen 11 which is machined with multiple vacuum grooves 27, connected to a vacuum unit at a single point. Grooves 27, typically 1/16" by 1/16" and machined on 1" centers in both directions, form a checkerboard pattern to drawn and maintain the electrode in position. 0-ring grooves 42 comprise rounded off grooves 27 and form a continuous groove for placement of an 0-ring corresponding to the desired electrode size, thereby giving reliable vacuum seal between platen 11 and the electrode.

Figure 4:
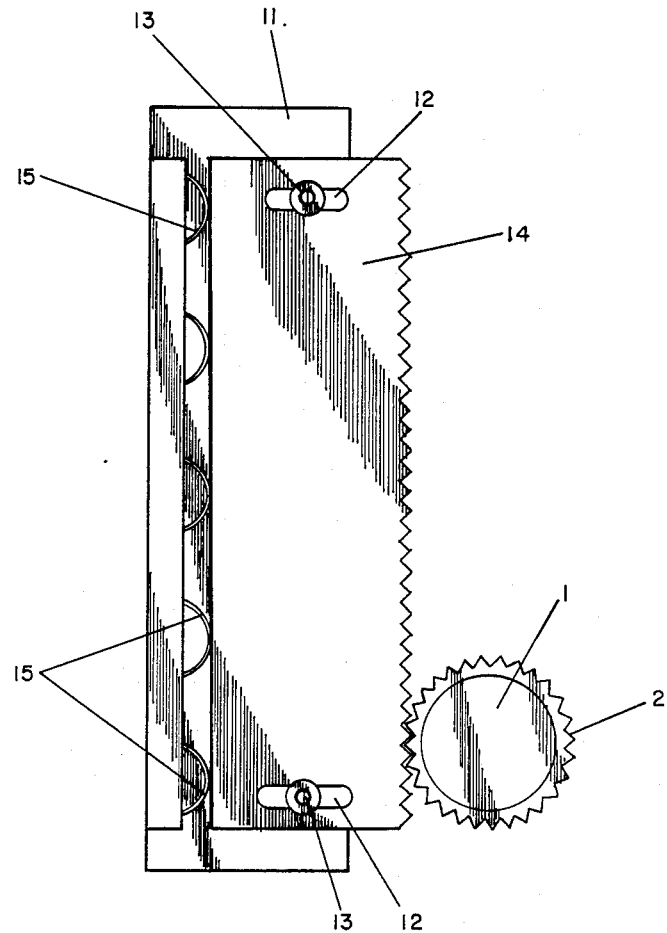
FIG. 4 is an enlarged side view of the EDM machine, showing the platen and mandrel interface.

As best seen on FIG. 4, rack gear 14 is loosely secured to the edge of platen 11 using precision shoulder bolts 13 attached to platen 11 which slidably fit within guide slots 12 on rack gear 14. Leaf springs 15, shown on FIG. 4 also attached to the edge of platen 11, are used to bias rack gear 14 in the direction of mandrel 1. The position of rack gear 14 is adjusted so as to mesh with corresponding teeth on spur gear 2 mounted in one end of mandrel 1.

The electrode (not shown) is of conventional EDM construction and is typically made of carbon graphite material or copper. It is positioned on platen 11 using pins or stops at the lower edge of platen 11 (not shown), but is held down using internal vacuum applied through grooves 27 in the surface of platen 11, thereby eliminating any interference problem which might arise in the use of mechanical clamping means. Platen 11 and the electrode are connected to one side of the electrical supply and, of course, are electrically isolated from the rest of the machine. When properly mounted to vertical frame 19, platen 11 and the electrode are fixed in exact parallel to the center line of mandrel 1 so as to maintain uniformity of the desired spark gap during vertical movement of platen 11. As the electrode wears and is machined for re-use, knob and linear actuator assembly 25 are used to re-position mandrel 1.

The biasing of rack gear 14 using springs 15 minimizes backlash problems caused by the lack of concentricity and linearity of the pitch line of teeth on spur gear 2 and rack gear 14 with the center line of mandrel 1. Typically, this problem would be avoided by allowing clearance in the interface between rack gear 14 and spur gear 2. Such clearance cannot be tolerated in this EDM technique, because of the potential for movement between the electrode and mandrel 1 when the electrode (servo motor) reverses direction. This clearance, in turn, can either eliminate the edges or create excessively wide edges on the sheet die which would require hand finishing of these edges. This is typically done in the prior art and is both expensive and difficult to do.

Figure 2:
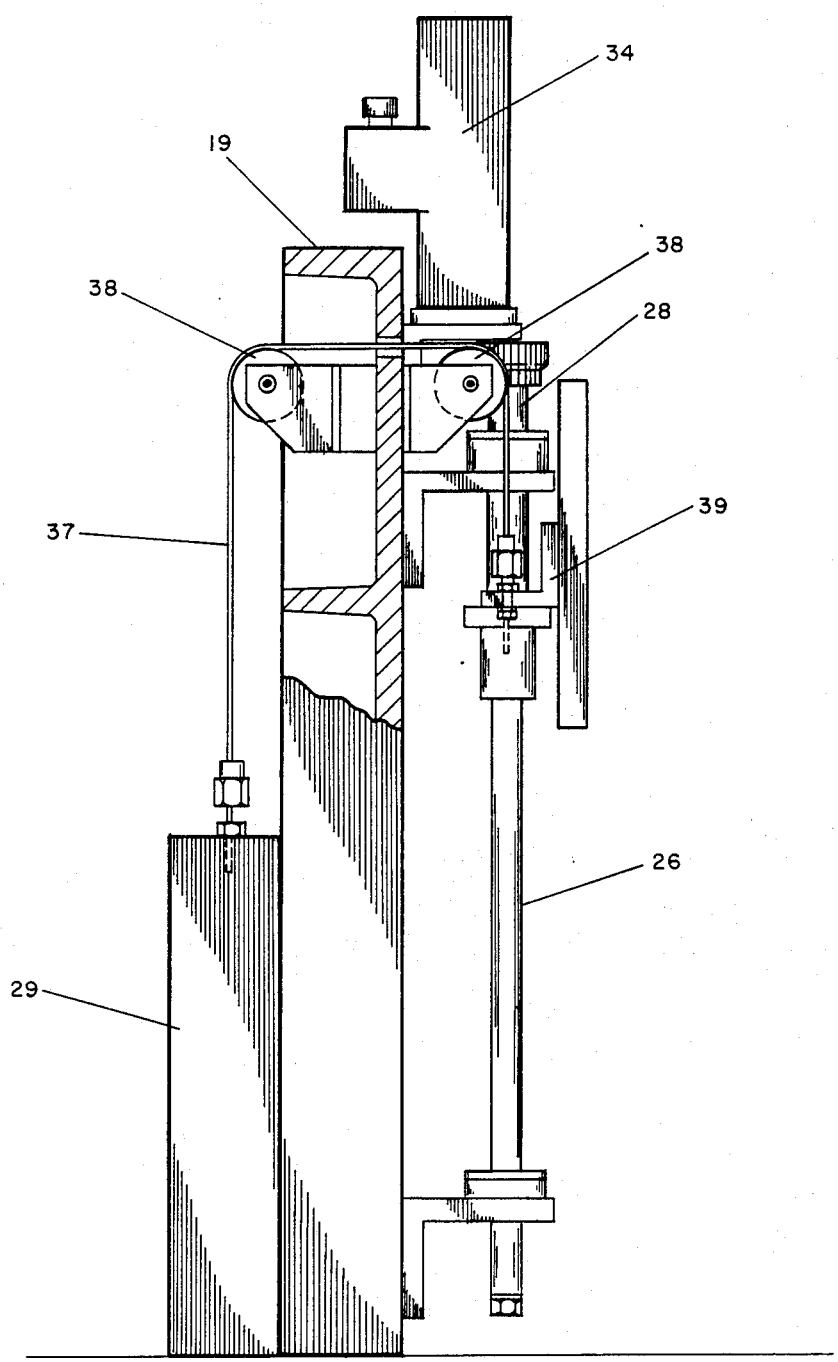
FIG. 2 is a partial side view of the EDM machine showing the servo motor and counterbalance system.

Platen 11 is driven downward on guiderails 26 by lead screw 28 powered by a quick response servo motor inside motor housing 34, shown on FIG. 2. A counterbalance means, also shown on FIG. 2 and conventionally comprising weight 29, cables 37 attached to platen bracket 39, and pulleys 38, is used to assist the drive system in effecting rapid directional change of platen 11 and the electrode to prevent DC arcing. To improve control over and/or to partially assist the counterbalance system, a chargeable air cylinder, piston, and rod assembly of conventional design (not shown) can be substituted for weight 29.

When the EDM unit is in operation, work tank 30 is filled with conventional dielectric fluid which is used to present a consistent arc medium and as a means for flushing and cooling the surfaces of the electrode and sheet 10. A conventional pump and filtration system (not shown) constantly recirculates the fluid to remove eroded material. In addition, a chiller unit of conventional design is placed in the recirculating fluid system to maintain the temperature of the dielectric fluid at around 45° F. This prevents excessive heat build-up on the sheet die 10 and maintains proper fluid viscosity. Dielectric fluid pumped from the work tank 30 is returned to the work area via flusher spray means 31 after passing through the chiller, filter and fluid reservoir. The configuration of spray means 31 can vary. For example, multiple fan-shaped nozzles can be used.

It should be noted that variations in the methods and means by which the various mechanical components are connected, many of which are entirely conventional, can be made without departing from the scope of the claimed invention.

What I claim is:

1. The method of manufacturing a rotary sheet die for use in the cutting of blanks or patterns in gasket material, paper webs, and the like, comprising the steps of:
   a. wrapping a steel sheet which is to be machined into a sheet die around a hollow cylindrical mandrel and securing said sheet by clamp means attached to and around said mandrel;
   b. placing the assembly of said mandrel and said sheet into a machine adapted for the cutting of patterns in cylindrical sheet dies; and
   c. drawing the inner surface of said sheet to the surface of said mandrel by means of vacuum applied from the center of said mandrel through holes in the surface of said mandrel.

2. The method of manufacturing a rotary sheet die for use in the cutting of blanks or patterns in gasket material, paper webs, and the like, comprising the steps of:
   a. wrapping a steel sheet which is to be machined into a sheet die around a hollow cylindrical mandrel and securing the ends of said sheet underneath clamp means attached to said mandrel;
   b. tightening the inner portions of said sheet against the surface of said mandrel by band clamp means located around the circumference of said sheet and mandrel;
   c. removing said clamp means from the ends of said sheet;
   d. attaching and tightening additional band clamp means between the ends of said sheet;
   e. placing the assembly of said mandrel and said sheet into a machine adapted for the cutting of patterns in cylindrical sheet dies; and
   f. drawing the inner surface of said sheet against the surface of said mandrel by means of vacuum applied from the center of said mandrel through holes in the surface of said mandrel.

3. The method of either claim 1 or claim 2 where said machine adapted for the cutting of a die pattern in said cylindrical sheet die is adapted for the electrical discharge machining of said sheet; and further comprising the step of vertically moving the electrode of said machine during the machining operation in synchronization with rotary movement of the assembly of said mandrel and said sheet.

4. The method of either claim 1, or claim 22 further comprising the step of flushing the area of said sheet and said mandrel being machined with dielectric fluid maintained at a temperature of approximately 45° F.

5. Apparatus for the manufacture of rotary sheet dies for use in the cutting of blanks or patterns in gasket material, paper webs, and the like comprising:
   a. base means;
   b. rotary support means for the assembly of the sheet to be machined and a cylindrical mandrel;
   c. vacuum means connected internally to said mandrel for drawing said sheet to said mandrel;
   d. vertical frame means adapted for supporting and allowing for vertical movement of platen means attached to said vertical frame means;
   e. EDM electrode means attached to said platen means;
   f. vertical rack gear means attached to said platen means, where said rack gear means is adapted to interface with rotary gear means attached to said mandrel such that vertical movement of said platen and electrode means will cause the synchronous rotary movement of said mandrel and said sheet during machining;
   g. means for flushing the exposed surfaces of said sheet and said electrode using recirculated and filtered dielectric fluid;
   h. means for chilling said recirculated dielectric fluid.

6. The apparatus of claim 5 where said vertical rack gear on said platen means is spring-biased in the direction of said rotary gear on said mandrel so as to minimize backlash.

7. The apparatus of claim 5 further comprising servo motor means for vertically moving said platen and electrode means and cooperative counter-balance means to facilitate quick reversal of movement of said platen and electrode means.

* * * * *